United States Patent [19]

Tsuyama et al.

[11] Patent Number: 5,022,483
[45] Date of Patent: Jun. 11, 1991

[54] SLIP CONTROL SYSTEM FOR A VEHICLE

[75] Inventors: Toshiaki Tsuyama; Kazutoshi Nobumoto; Fumio Kageyama; Akira Sone; Makoto Kawamura, all of Hiroshima, Japan

[73] Assignee: Mazda Motor Corporation, Hiroshima, Japan

[21] Appl. No.: 543,551

[22] Filed: Jun. 26, 1990

[30] Foreign Application Priority Data

Jun. 29, 1989 [JP] Japan .................................. 1-167992

[51] Int. Cl.$^5$ ............................................. B60K 31/00
[52] U.S. Cl. .................................... 180/197; 123/333; 364/426.02
[58] Field of Search .............. 180/197, 76; 123/198 B, 123/332, 333; 364/426

[56] References Cited

U.S. PATENT DOCUMENTS

| | | | |
|---|---|---|---|
| 4,856,476 | 8/1989 | Shirakawa | 180/197 X |
| 4,856,477 | 8/1989 | Hanaoka et al. | 180/197 X |
| 4,940,109 | 7/1990 | Preston et al. | 180/197 |
| 4,959,794 | 9/1990 | Shiraishi et al. | 180/197 X |

Primary Examiner—Charles A. Marmor
Assistant Examiner—Alan M. Kagen
Attorney, Agent, or Firm—Fish & Richardson

[57] ABSTRACT

When the driven wheel of the vehicle slips against the road surface to a large extent, such a large slip of the driven wheel can be converged by reducing torque to be applied to the driven wheel by slip control, i.e., by control the throttle valve for adjusting a load of the engine in a direction of forcibly closing the throttle valve prior to operation of the accelerator. In a region of the opening angle of the accelerator nearby its full open region, for example, accounting for 75% or more, a control-unreactive region is provided which is unreactive to slip control, thereby preventing the throttle valve from lowering a given opening angle, for example, 25%. This arrangement can retain the opening angle of the accelerator nearby its full open position even if slip control cannot work normally, thereby ensuring an open state of the throttle valve and allowing the vehicle to run at least to a tune-up factory nearby.

37 Claims, 15 Drawing Sheets

SLIP CONTROL SYSTEM FOR A VEHICLE

BACKGROUND OF THE INVENTION

1. Field of the Invention

The present invention relates to a slip control system for a vehicle and, more particularly, to a slip control system for the vehicle, adapted to prevent a slip of the driven wheels on a road surface from becoming excessive.

2. Description of Related Art

Prevention of a slip of the driven wheels from becoming excessive at the time of accelerating or the like is effective in order to efficiently provide a propulsive force of the vehicle as well as to provide safety in terms of prevention of a spin of the vehicle body and so on. In order to prevent an excessive amount of a slip of the driven wheels, torque to be applied to the driven wheels as a cause of slipping may be reduced.

Slip control of this type is disclosed, for example, in Japanese Patent Unexamined Publication Nos. 170,740/1987 and 22,948/1982 and U. S. Pat. Nos. 4,484,280 and 4,583,611 (corresponding to Japanese Patent Unexamined Publication (kokai) Nos. 16,948/1983 and 56,662/1985, respectively).

In performing slip control, the torque to be applied is reduced by adjusting a load of the engine with smoothness in control, mileage or the like taken into consideration. For an engine of an Otto type, it is preferred to reduce a throttle valve opening angle and, for a diesel engine, it is preferred to reduce an amount of fuel injection. In this case, as a load adjusting means, such as a throttle valve, is operated by the accelerator, the load adjusting means is forcibly driven upon slip control in the direction of reducing the torque to be generated by the engine, prior to operation of the accelerator.

It is to be noted, however, that, if the driven wheel slips to an extremely great extent, the situation may occur wherein the opening angle of the load adjusting means, such as the throttle valve, is caused to become nearly zero and the throttle valve might be fixed in the position close to zero for some reasons. In order to avoid this situation, a control-unreactive area is provided so as not to cause an operational amount of the load adjusting means to reach nearly zero, i.e., to cause the opening angle of the throttle valve to come to nearly zero, prior to slip control, with the attempt to ensure the least possible running when the accelerator is nearly full open. More specifically, if the load adjusting means is the throttle valve, it is considered to set a control-unreactive area such that the throttle valve opening angle is caused not to be reduced to less than 25%, for example, by means of the slip control when the accelerator is full open.

It should be noted, however, that there is the occasion that the throttle valve opening angle be required to become smaller than 25%, i.e., 10% or smaller, for example, from the viewpoint of the requirement for slip control. In this case, it can be noted that the torque to be applied to the driven wheels becomes greater than the value required by the slip control by 15% of the throttle valve opening angle to be cancelled by the control-unreactive area. As a result, convergence of a slip of the driven wheels may be worsened.

SUMMARY OF THE INVENTION

Therefore, the present invention has been completed under the situation as described hereinabove and it has the object to provide a slip control system for a vehicle, adapted to favorably converge a slip of the driven wheel, even when a control-unreactive area is provided in order to ensure the least possible running, given the slip control being performed at least by adjusting a load to be applied to the engine.

In order to achieve the object, the present invention consists of a slip control system for a vehicle having a load adjusting means for adjusting a load of an engine and a slip control means for reducing torque to be generated by the engine by controlling the load adjusting means prior to operation of an accelerator when a driven wheel slips to a large extent, wherein:

a control-unreactive region is provided so as to allow the load adjusting means to ensure a given amount of operation nearby a maximum opening angle of the accelerator prior to slip control by the slip control means;

an engine control means is provided for controlling the engine on the basis of a predetermined condition so as to change the torque to be generated by the engine without control of the load adjusting means; and a correction means for correcting a control value of the engine control means in a direction of reducing the torque to be generated by the engine in the control-unreactive region.

The control objective to be controllable by the engine control means may include, for example, spark timing, air-fuel ratio or EGR rate.

In the control-unreactive region, the slip control by the slip control means alone makes the torque to be applied to the driven wheels greater than the value required by the slip control. In this case, however, the torque to be generated by the engine is reduced by correcting a control value of the engine control means, for instance, by retarding the spark timing. Hence, the limit placed upon the slip control by the slip control means, a limit which may be caused by the provision of the control-unreactive region, can be compensated, thereby converging a slip of the driven wheels quicker.

Therefore, the present invention can certainly ensure the torque of the engine required for the least possible running by providing the control-unreactive region and can rapidly converge the slip of the driven wheels even in the control-unreactive region.

Other objects, features and advantages of the present invention will become apparent in the course of the description of the preferred embodiments, which follows, in conjunction with the accompanying drawings.

DETAILED DESCRIPTION OF THE PREFERRED EMBODIMENTS

The present invention will be described in more detail with reference to the accompanying drawings. In this embodiment, slip control is performed by reducing torque to be generated from the engine by reducing an opening angle of the throttle valve and by applying a braking power to the driven wheels. And the object in which a control value is corrected in a control-unreactive region is a spark timing.

Figure 1:
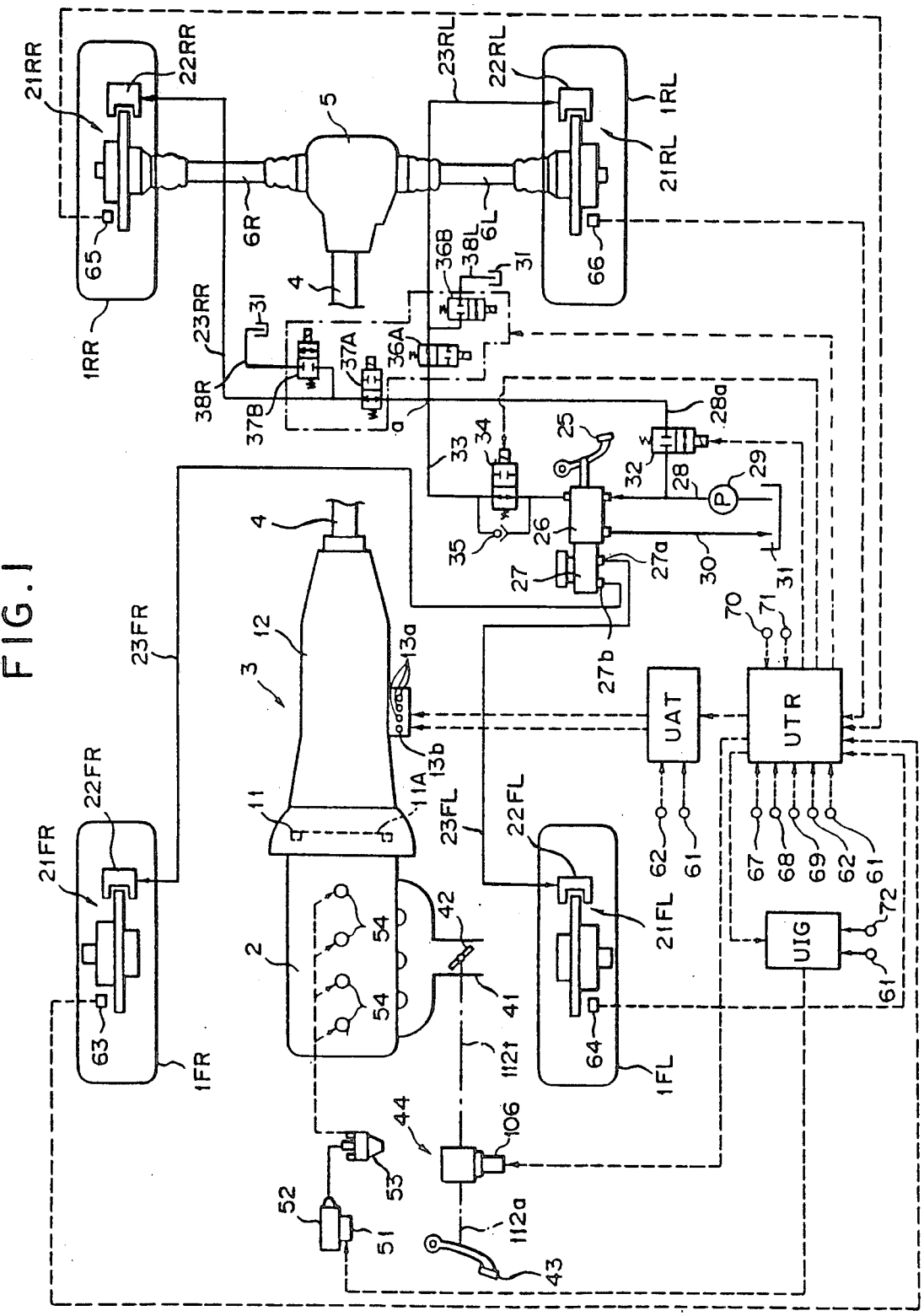
FIG. 1 is a diagrammatical representation of an outline of the slip control system according to an embodiment of the present invention.

As shown in FIG. 1, an automobile A is shown to be of a rear wheel drive system in which a left-hand front wheel 1FL and a right-hand front wheel 1FR are undriven wheels, and a left-hand rear wheel 1RL and a right-hand rear wheel 1RR are driven. An engine 2 loaded on a front portion of the vehicle body generates torque that is then transmitted through an automatic transmission 3, a propeller shaft 4 and a differential gear 5 to a left-hand drive shaft 6L and then to the left-hand rear wheel 1RL, on the one hand, and to a right-hand drive shaft 6R and then to the right-hand rear wheel 1RR, on the other hand.

Transmission:

Referring to FIG. 1, the automatic transmission 3 comprises a torque converter 11 and a multiple shift geartrain 12. The multiple shift geartrain 12 is of a hydraulically operative type as is known to the skilled in the art. In this embodiment, the geartrain has four forward speed ranges and one reverse speed range, for example, and is of the type that implements the gear shift by altering a combination of exciting and deenergizing a plurality of solenoids 13a mounted in its hydraulic pressure circuit. The torque converter 11 has a lockup clutch 11a of a hydraulically operative type and is coupled or uncoupled by altering a combination of energizing or deenergizing solenoids 13b incorporated in the hydraulic pressure circuit.

The solenoids 13a and 13b are controlled by a control unit UAT for automatic transmission. The control unit UAT has stored two kinds of shift characteristics, i.e., shift characteristics and lockup characteristics, as are known to the art, thereby performing shift control and lockup control based on those characteristics, respectively. In order to perform these controls, a signal for the throttle valve opening angle from a sensor 61 and a signal for the vehicle speed (in this embodiment, a signal for the number of revolutions of a propeller shaft 4) from a sensor 62 enter into the control unit UAT.

Adjustment of Braking Liquid Pressures:

As shown in FIG. 1, the front wheels 1FR, 1FL and the rear wheels 1RR, 1RL are provided with brakes 21FR, 21FL, 21RR and 21RL, respectively. The wheels 1FR, 1FL, 1RR and 1RL have calipers (wheel cylinders) 22FR, 22FL, 22RR and 22RL to which braking liquid pressure is fed through passages 23FR, 23FL, 23RR and 23RL, respectively.

The construction for supplying the braking liquid pressure to each of the brakes 21FR, 21FL, 21RR and 21RL will be described as follows. The power generated by depressing a brake pedal 25 is increased by a servo unit 26 of a liquid pressure servo type and transmitted to a master cylinder 27 of a tandem type. To a first exit 27a from the master cylinder 27 is connected the braking passage 23FL for the left-hand front wheel. To a second exit 27b of the master cylinder 27 is connected the braking passage 23FR for the right-hand front wheel.

To the servo unit 26 is fed liquid pressure from a pump 29 through a passage 28, and a surplus of the liquid pressure is returned to a reservoir tank 31 through a passage 30. A branch passage 28a branched from the passage 28 is connected to a recombining section as will be described hereinafter, and a switching valve 32 of electromagnetic type is connected to the branch passage 28a. The liquid pressure generated by the servo unit 26 is fed to the recombining section a through a passage 33 which in turn is provided with a switching valve 34 of an electromagnetic type. The passage 33 is further provided with a one-way restrictor 35, disposed in parallel to the switching valve 34, so as to allow only a flow toward the recombining section a.

To the recombining section are further connected braking passages 23RR and 23RL for the right-hand and left-hand rear wheels, respectively. To the passages 23RL and 23RR are connected switching valves 36A and 36A, each of electromagnetic type, respectively, and another switching valves 36B and 37B are connected to respective relief passages 38L and 38R connected on the downstream sides of the respective valves 36A and 37A.

All the valves 32, 34, 36A, 36B, 37A and 37B are controlled by the control unit UTR for slip control. During no execution of slip control, the valve 32 is closed, the valve 34 is open, the valves 36A and 37A are open, and the valves 36B and 37B are closed, as shown in the drawing. With this arrangement, once the brake pedal is depressed, the braking liquid pressure is fed through the master cylinder 27 to the brakes 21FR and 21FL for the front wheels, while the liquid pressure from the servo unit 26 is fed as braking liquid pressure through the passage 33 to the brakes 21RR and 21RL, respectively, in accordance with the power generated by depressing the brake pedal 25.

As will be described hereinafter, when slip control is to be executed when a slip value of the rear wheels 1RR and 1RL as the driven wheels against the road surface becomes greater, the valve 34 is closed while the valve 32 is opened. The braking liquid pressure is retained, increased or decreased by duty control of the valves 36A and 36B (37A and 37B). More specifically, given the valve 32 being open, the braking liquid pressure is retained when the valves 36A, 36B, 37A and 37B are closed; it is increased when the valve 36A (37A) is open and the valve 36B (37B) is closed; and it is decreased when the valve 36A (37A) is closed while the valve 36B (37B) is open. The braking liquid pressure passed through the branch passage 28a is arranged so as not to act upon the brake pedal 25 as counterforce by means of the one-way refractor 35.

During slip control, when the brake pedal 25 is depressed, the braking liquid pressure from the servo unit 26 is generated in accordance with the power generated by depressing the brake pedal and supplied to the brakes 21RR and 21RL for the rear wheels.

Adjustment of Torque Generated by Engine:

Referring to FIG. 1, the control unit UTR for slip control or traction control brakes the driven rear wheels 1RL and 1RR and reduces the torque to be generated by the engine in order to reduce the torque applied to the driven rear wheels 1RL and 1RR. At this end, a throttle opening angle adjustment mechanism 44 is interposed within a connection mechanism of a throttle valve 42 disposed in an intake air passage 41 for the engine to an accelerator pedal 43.

The throttle opening angle adjustment mechanism 44 will be described in conjunction with FIG. 2.

Referring now to FIG. 2, the throttle opening angle adjustment mechanism 44 is shown to comprise three levers, i.e., first lever 112, second lever 113, and third lever 114, each of which is slidable in the left-hand and right-hand directions in the drawing. The first lever 112 is connected to the accelerator pedal 43 through an accelerator wire 112a and the second lever 113 is connected to the throttle valve 42 through a throttle wire 112t. The second lever 113 is arranged to be biased by a return spring 121 in the right direction in the drawing, namely, in a direction in which the throttle valve 42 is closed.

The third lever 114 comprises a first engagement section 114a engageable with the first lever 112 from the right direction in the drawing and a second engagement section 114b engageable with the second lever 113 from the right direction in the drawing. Between the first lever 112 and the third lever 114 is mounted a first spring 116 so as to bias the first engagement section 114a of the third lever 114 in a direction in which the first engagement section 114a is brought into abutment with the first lever 112. Between the second lever 113 and the third lever 114 is mounted a second spring 122 so as to bias the second engagement section 114b thereof in a direction to allow the second engagement section 114b to come into abutment with the second lever 113. The biasing force of the first spring 116 is set to be larger than the biasing force of the second spring 122 and the return spring 121.

The first lever 112 is provided with an engagement section 112b in its right position in the drawing, thereby regulating the second lever 113 from displacing in a predetermined distance toward the right direction relative to the first lever 112.

A press lever 111 is disposed on the left side of the third lever 114 in the drawing, which is driven in the left and right directions in the drawing by means of a motor 106 and whose left direction beyond a predetermined distance is yet blocked by a stopper 123 which is arranged so as to abut with the press lever 111.

The action of the throttle opening angle adjustment mechanism 44 will now be described hereinafter.

Figure 2A:
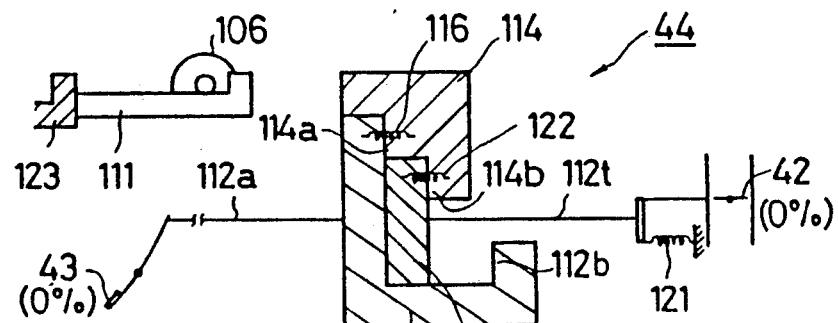
FIGS. 2(a) to 2(d) are diagrammatic representations in section showing the manners in which a throttle opening angle adjusting mechanism is operated.
Figure 2B:
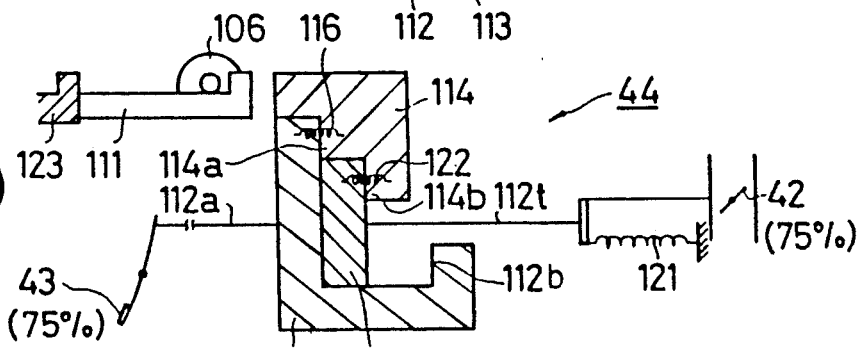

First, when the press lever 111 is in abutment with the stopper 123, no exterior force is applied to the third lever 114 so that the first lever 112 is in such a state that the first lever 112 is always integral with the second lever 113 and the third lever 114, as shown in FIGS. 2(a) and 2(b), thus providing a throttle opening angle in accordance with an accelerator opening angle. In other words, the throttle valve is opened at an opening angle which varies from 0% to 100% with the accelerator which in turn is opened at an opening angle ranging from 0% to 100%, respectively. FIG. 2(a) represents the throttle opening angle of 0% while the accelerator opening angle is 0%. FIG. 2(b) represents the throttle opening angle of 75% in accordance of a 75% accelerator opening angle. In the case as shown in FIG. 2(b), there is still a clearance between the press lever 111 and the third lever 114, and this clearance is one in which the accelerator opening angle can account for from 0% to 100%. As the throttle opening angle reaches just 100%, i.e., as the accelerator opening angle becomes 100%, the third lever 114 is brought into slight abutment with the press lever.

Figure 2C:
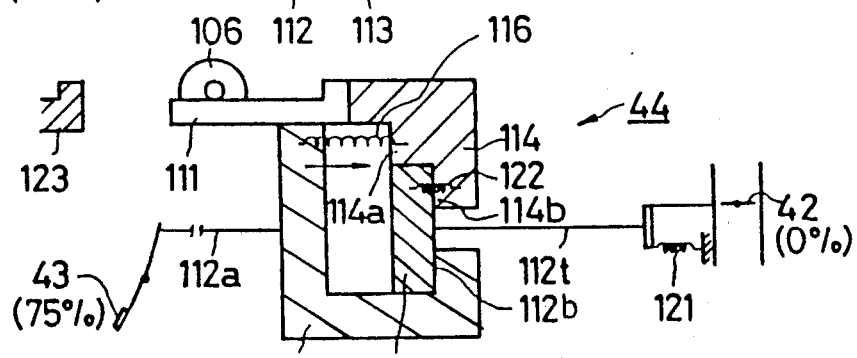

When the motor 106 is then operated to drive the press lever 111 from the state as shown in FIG. 2(b) toward the right in the drawing, the third lever 114 is forced to move to the right in resistance to the first spring 116 as shown in FIG. 2(c). This causes the throttle opening angle to be returned in the direction of closure even if the accelerator opening angle is the same. FIG. 2(c) represents the state in which the throttle opening angle is returned to a full closed state when the accelerator opening angle accounts for 75%. In this case, the engagement section 112b of the lever 112 is brought into abutment with the second lever 113.

Figure 2D:
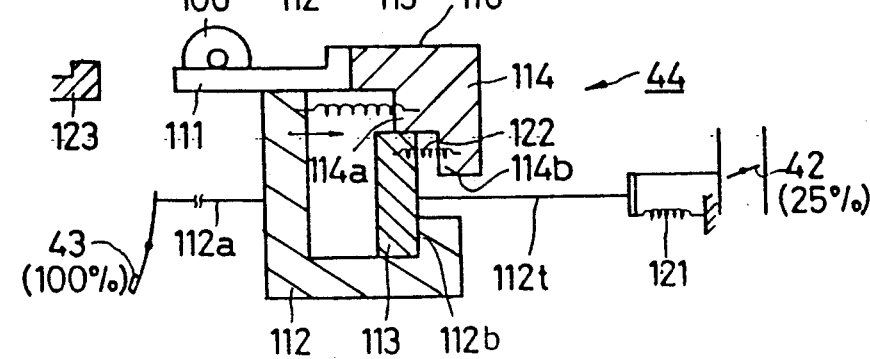

When the accelerator opening angle is forced to account for 100% as shown in FIG. 2(d) from the state as shown in FIG. 2(c), then the first lever 112 is forced to move toward the left in the drawing while the engagement section 112b is forced to move the second lever 113 toward the left, too, in accompany with the leftward movement of the first lever 112. This changes the state as shown in FIG. 2(c) in which the throttle opening angle is 0% to the state as shown in FIG. 2(d) in which the throttle opening angle is 25%.

In this embodiment, the throttle valve 42 can be opened at its opening angle up to 25% by operating the accelerator to be opened to its full open state. Thus, even if the press lever 111 would have been stuck in the state as shown in FIG. 2(c), the automobile could be driven by itself at least to a tune-up factory or any other appropriate locations nearby. In other words the region in which the accelerator opening angle is 75% or more is a control- unreactive region in which the motor 106 cannot control, namely, a region in which the throttle opening angle cannot be decreased by slip control.

As will be apparent from the foregoing description, the spring 122 is no longer necessary.

Outline of Slip Control

In performing slip control, the control unit UTR for slip control implements brake control and engine control to be implemented by controlling the motor 106 for the throttle opening angle adjustment mechanism 44. The control unit UTR is provided with inputs of signals from the sensors 63, 64, 65 and 66 for sensing each of the wheel speeds, a signal of the throttle opening angle from a sensor 61, a signal of a vehicle speed from a sensor 62, a signal of the accelerator opening angle from the sensor 67, a signal of an opening angle for the motor 106 from a sensor 68, a signal of a steered angle of the steering wheel from a sensor 69, a mode signal from a switch 70 to be manually operable, and a brake signal from a brake switch 71 so as to be turned on when the brake pedal is depressed.

Figure 3:
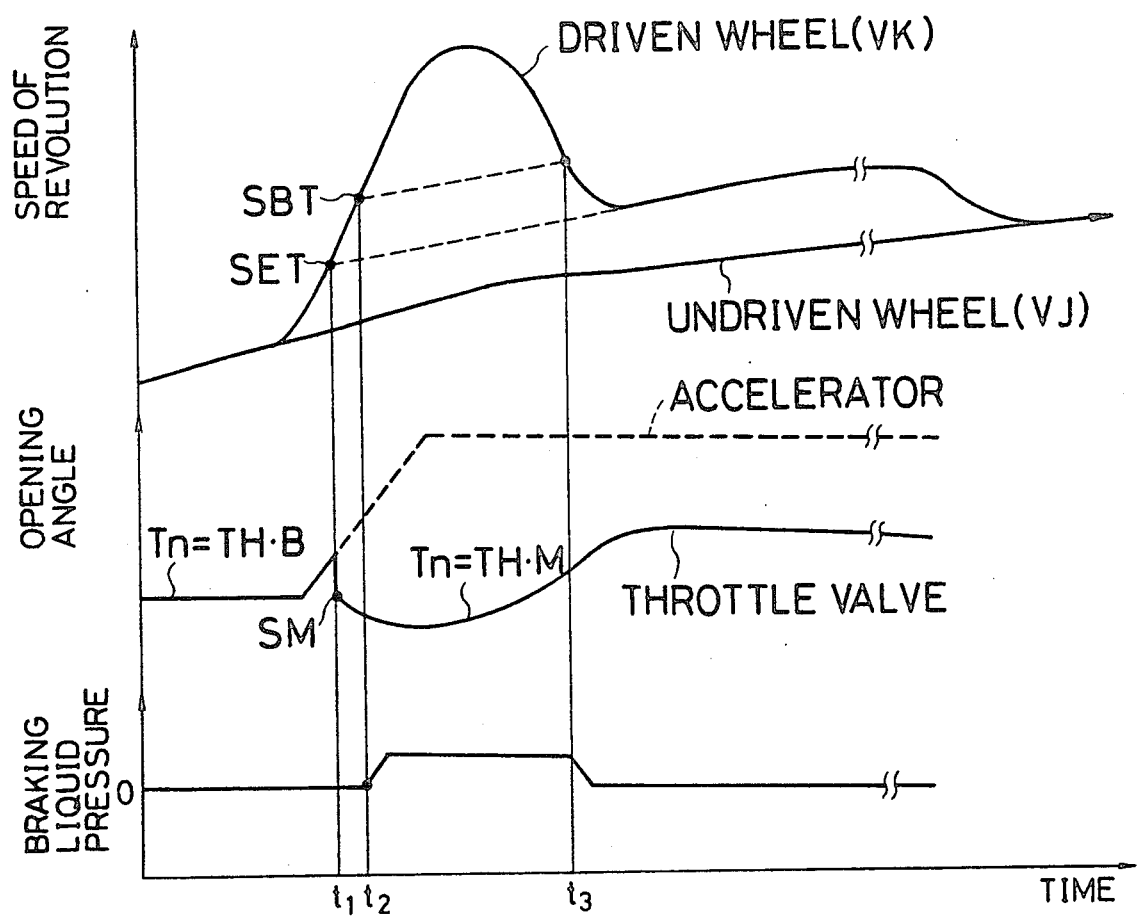
FIG. 3 is a time chart showing an outline of slip control.

FIG. 3 indicates the contents of the slip control with a focus on the engine control and the brake control. In FIG. 3, a target value for engine (a target slip value of the driven wheel) is represented by SET, while a target value for brake is represented by SBT (SBT > SET).

Figure 9:
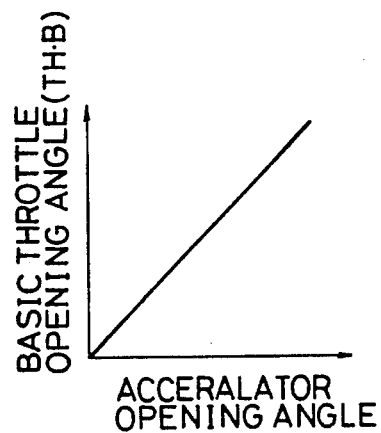
FIG. 9 is a graph showing a basic throttle characteristic.

As the driven wheels cause no slipping to a large extent prior to the time point t1, the throttle opening angle corresponds to the accelerator opening angle. In other words, the throttle opening angle is represented by a basic throttle opening angle TH·B obtainable on the basis of the basic throttle characteristic as shown in FIG. 9.

At the time pint t1, a slip occurs to such a large extent that a slip value of the driven wheel becomes the target value SET or higher. In this embodiment, slip control is started when the slip value of the driven wheel becomes the target value SET or higher. At this time point t1, the throttle opening angle is immediately reduced down to the lowest control value SM (feed-forward control). Once it is lowered to the lowest control value SM, the opening angle of the throttle valve is subjected to feedback control so as to allow the slip value of the driven wheel to become the target value SET for engine. In this case, the target throttle opening angle is indicated by TH·M (the opening angle of the motor 106 = an amount of operation) (TH·M ≦ TH·B).

At the time point t2 when the slip value of the driven wheel reaches the target value SBT for brake or higher, the braking liquid pressure is supplied to the brakes 21RR and 21RL of the driven wheels so as to start up slip control by both the engine control and brake control. In this case, the braking liquid pressure is subjected to feedback control so as for the slip value of the driven wheel to reach the target value SBT for brake.

At the time point t3 when the slip value of the driven wheel becomes smaller than the target value SBT for brake, the braking liquid pressure is gradually decreased and eventually to zero. The slip control by the engine is still continued.

In this embodiment, the condition in which the slip control is suspended is when the accelerator is closed to a full extent.

Detail of Slip Control:

Detail of the slip control by the control unit UTR will be described hereinafter with reference to the flow charts.

Main Routine (FIG. 4):

First, at step P1, signals from the sensors and switches are read. Then at step P2, it is decided whether the control unit UTR for slip control is brought into trouble or out of order. The manner in which the control unit UTR is brought into trouble or out of order may include, for example, the cases in which a memory means equipped in the control unit UTR does not work to such an extent that data cannot be read from a ROM or a value read is abnormal or that data cannot be written in a RAM or read therefrom or a value read therefrom is abnormal, in which various control values to be decided are wrong, as will be described hereinafter, or in which a CPU is something wrong or input signals from the sensors or switches are abnormal.

When the decision at step P2 is YES, on the one hand, slip control is suspended at step P11 and an out-of-order or trouble signal is generated at step P12 to a control unit UTG for controlling spark timing. When it is decided at step P11 that slip control is under way, the braking liquid pressure for slip control is lowered to zero, and the throttle opening angle is brought into dependence upon the accelerator opening angle. When such an out-of-order signal occurs, an alarm such as a lamp or a buzzer may be arranged so as to operate.

When the decision at step P2 is NO, on the other hand, the flow proceeds to step P3 where an actual slip value S for the driven wheel is calculated by subtracting a revolution speed VJ of the undriven wheel from a revolution speed VK of the driven wheel. In calculating this actual slip value S, for instance, the revolution speed VJ of the undriven wheel for the engine is used as an average of the revolution speeds of the left-hand and right-hand undriven wheels and the revolution speed VK of the driven wheel for the engine is used as a revolution speed of the left-hand driven wheel or the right-hand driven wheel, whichever larger, while the revolution speed VJ of the undriven wheel for the brake is the same as that for the engine and the revolution speed VK of the driven wheel for the brake is selected from individual revolution speeds of the left-hand and right-hand driven wheels, respectively. In this case, the braking power to the left-hand and right-hand driven wheels is controlled individually and independently.

At step P4, it is decided whether the accelerator is currently in a full closed state. If the decision at step P4 is NO, it is then decided at step P5 whether slip flag is set to 1. That the slip flag is set to 1 means that slip control is under way. If the decision at step P5 is NO, the flow proceeds to step P6 where it is further decided whether a slip value S for the driven wheel is equal to or greater than the target value SET for engine. If the decision is YES at step P6, the flow advances to step P7 where the slip flag is set to 1 and the lowest control value SM is set. After step P7, the flow proceeds to step P8. When the decision at step P5 is YES, the flow proceeds to step P8 without passage through steps P6 and P7.

At step P8, brake control is performed as will be described hereinafter. The content of the brake control is to decide and realize the target value SBT for brake.

After step P8, the flow advances to step P9 where the target value SET for engine is decided in a manner as will be described hereinafter, and a throttle opening angle (an opening angle of the motor 106) TH·M to be required for realization of this target value SET for engine is decided on the basis of a given formula for feedback control. The realization of the target value SET for engine, i.e., output of the throttle opening angle TH·M, is performed by interruption processing for throttle control as will be described hereinafter.

When the decision at step P4 is YES, slip control is suspended by resetting the slip flag to zero at step P10.

Figure 4:
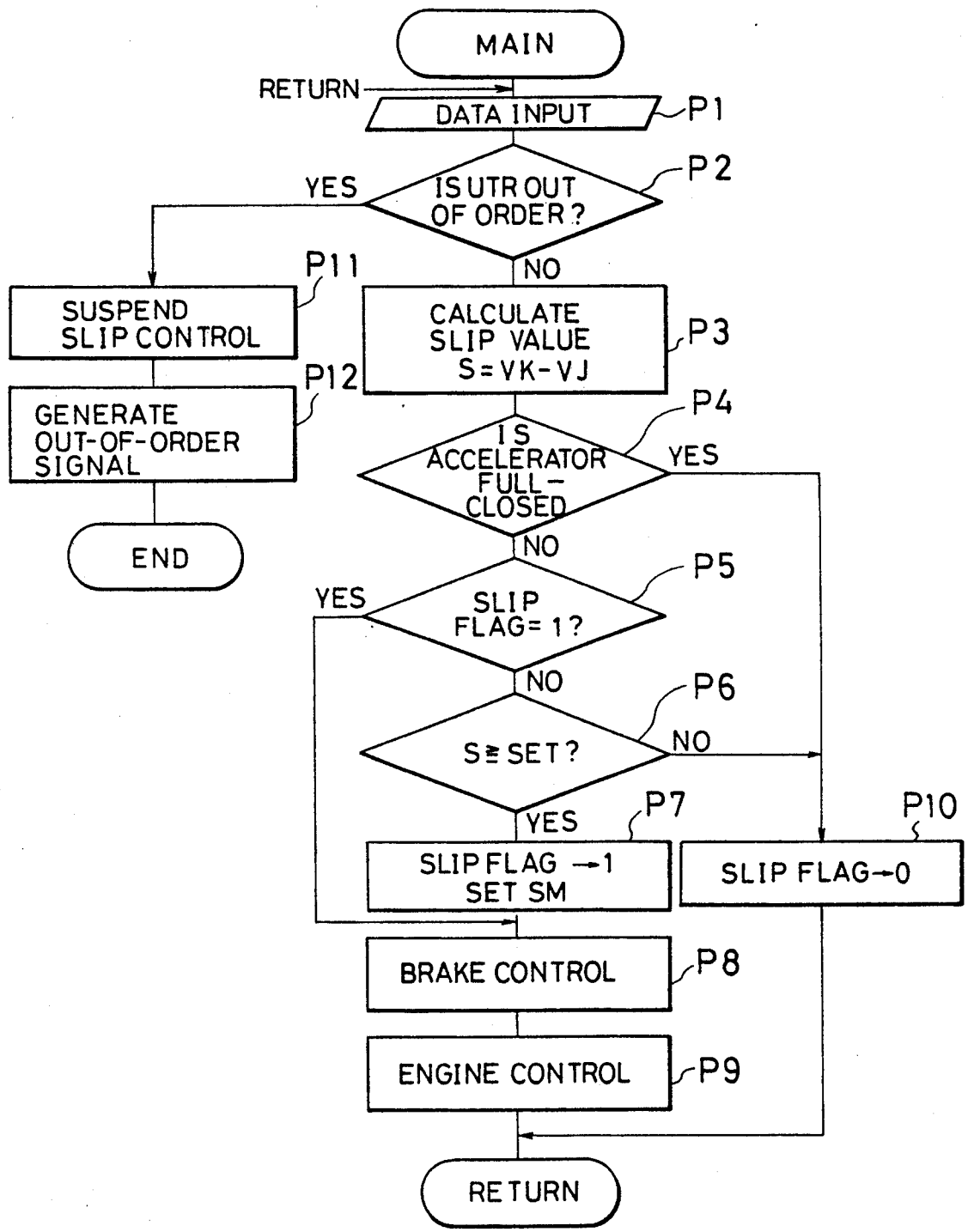
FIGS. 4–6 and 10 are flow charts showing control examples in accordance with the present invention.
Figure 5:
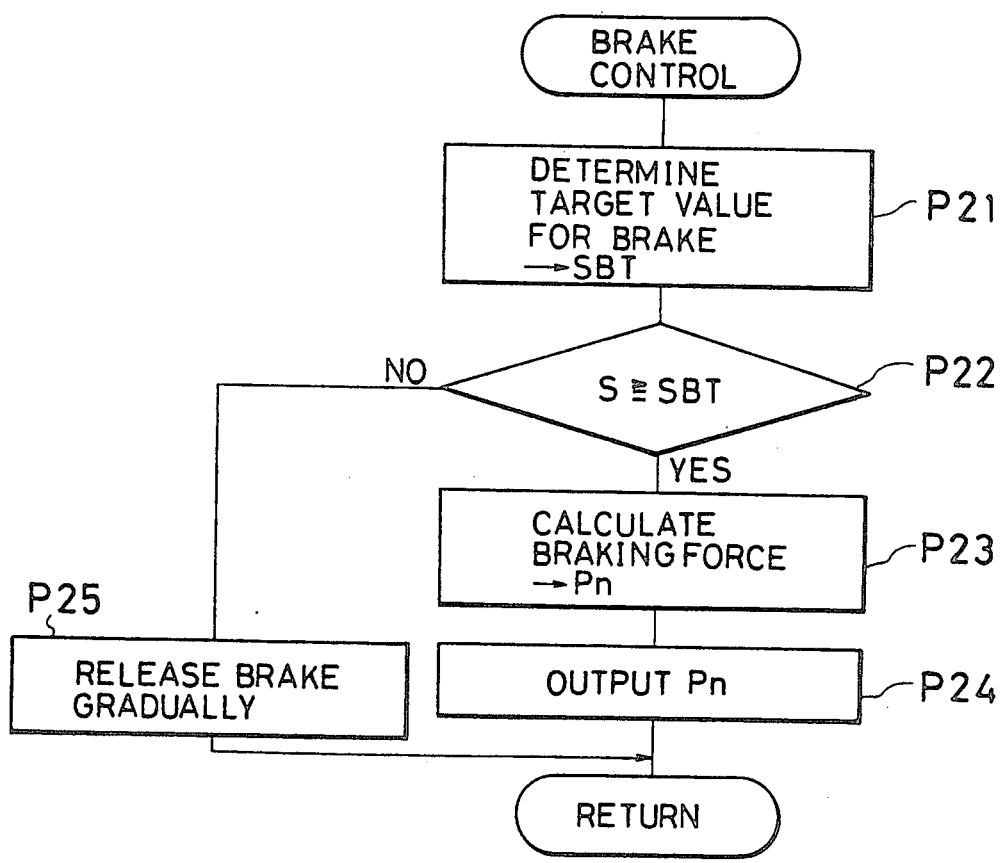

FIG. 5 (Step P8 of FIG. 4)

In FIG. 5 showing the content of brake control, the target value SBT for brake is first decided at step P21 and it is then judged at step P22 whether the slip value S for the driven wheel is greater than the target value SBT for brake. If the decision at step P22 is YES, on the one hand, a braking power Pn (an amount of operating the valves 36A and 36B or the valves 37A and 37B =duty ratio) necessary to make the slip value S reach the target value SBT is decided at step P23. Then at step P24, the signal corresponding to the decided braking power Pn is generated to the above valves. If the decision at step P22 is NO, on the other hand, the braking liquid pressure is gradually decreased at step P25. In some case, the braking liquid pressure may be decreased to zero.

FIG. 6

Figure 6:
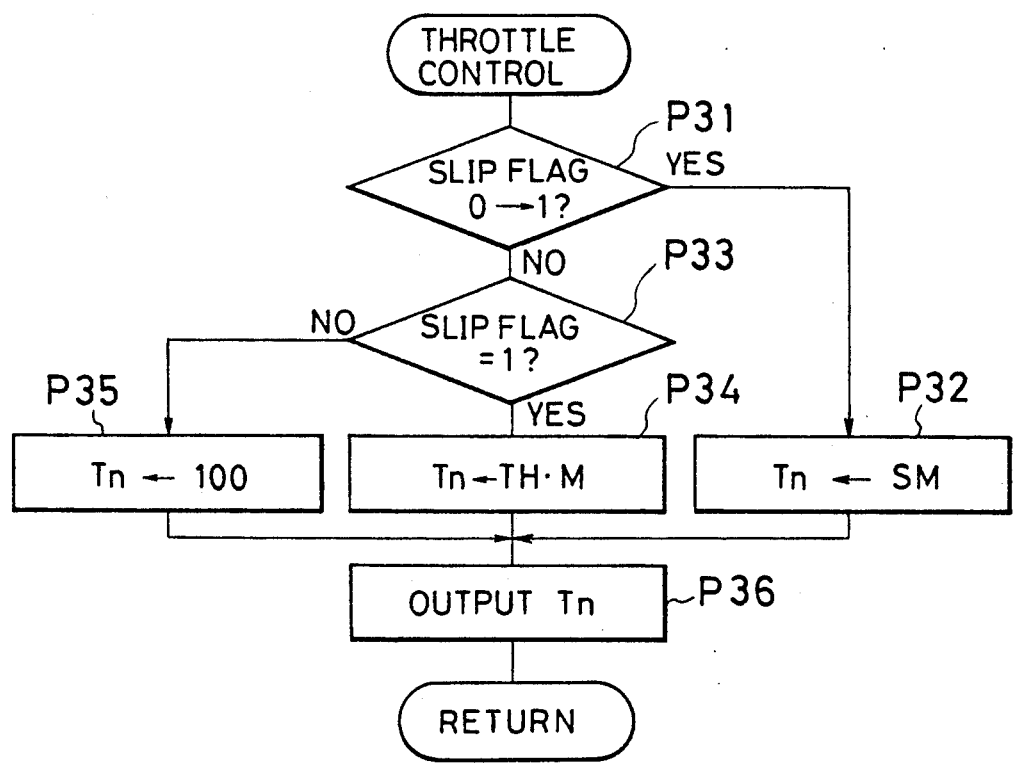

The process of FIG. 6 is executed by interruption into the flow chart of FIG. 4 at each predetermined time and it is to control the driving of the throttle valve. At step P31, it is decided whether it is the time when the slip flag has changed from zero to one, namely, it is the time t1 of FIG. 3. If the decision at step P31 is YES, on the one hand, the flow proceeds to step P32 where the final target throttle opening angle Tn (the motor opening angle) is set as the lowest control value SM to be decided as will be described hereinafter.

If it is decided at step P31 that it is not the time when the slip flag has changed to one from zero, on the other hand, it is then decided at step P33 whether or not the slip flag is 1. If the decision at step P33 is YES, the flow proceeds to step P34 and the final target throttle opening angle Tn is set as the throttle opening angle TH·M to be decided at step P9 of FIG. 4.

If the decision at step P33 is NO, this means that no slip control is performed so that the final target throttle opening angle Tn is set to 100 and the characteristic depending upon the accelerator opening angle, as shown in FIG. 9, is provided.

After steps P32, P34 or P35, the motor 106 is driven so as to generate the final target throttle opening angle Tn at step P36.

Target Values SET & SBT for Slip Control And Lowest Control Value SM

Description will be made of an example of determining the target value SET for engine and the target value SBT for brake as well as the lowest control value SM (at the time point t1 in FIG. 1), in performing slip control.

Figure 7:
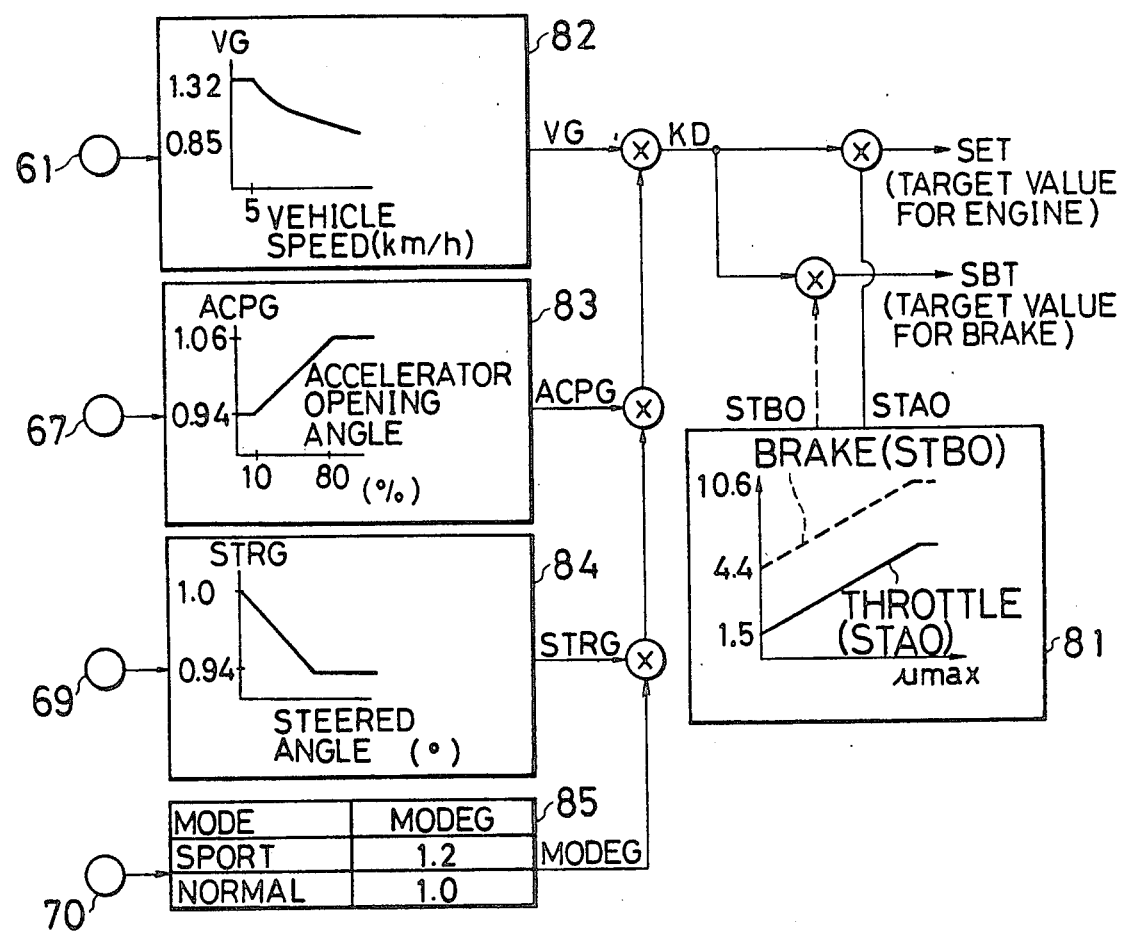
FIG. 7 is a circuit view for determining slip target values for the engine and for the brake.

FIG. 7 shows the block diagram illustrating the circuit for determining the target values SET and SBT for engine and for brake, respectively, in which the vehicle speed, the accelerator opening angle, the steered angle of a steering wheel, an operational status of the mode switch 70, and the maximum friction coefficient, μ max, against the road surface are used as parameters. In FIG. 7, the basic value STAO of the target value SET for engine and the basic value STBO of the target value SBT for brake are stored in a map 81 using the maximum friction coefficient as a parameter (STAO < STBO). It is thus to be noted that the target values SET and SBT are obtained by multiplying the basic values STAO and STBO, respectively, by a correction gain coefficient KD.

The correction gain coefficient KD is obtained b multiplying each of gain coefficients VG, ACPG, STRG and MODEG. The gain coefficient VG is determined by using the vehicle speed as a parameter and is stored as a map 82. The gain coefficient ACPG is determined by using the accelerator opening angle as a parameter and is stored as a map 83. The gain coefficient STRG is determined by using the steered angle of the steering wheel as a parameter and is stored as a map 84. The gain coefficient MODEG is selected manually by the operator and stored as a table 85 in which two modes comprised of sport mode and normal mode are set.

Figure 8:
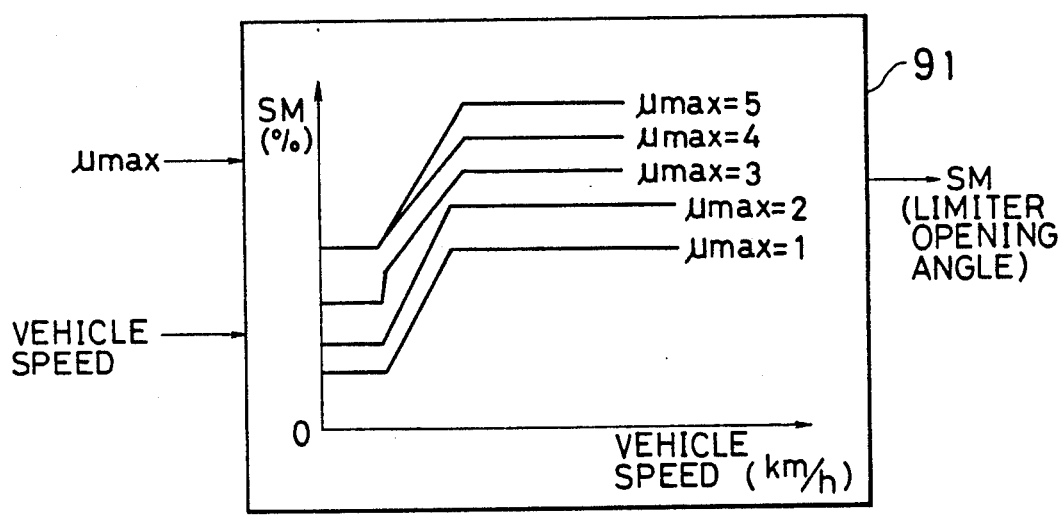
FIG. 8 is a view showing mappings for determining the lowest control value in the slip control.

The lowest control value SM is determined by using the vehicle speed and the maximum friction coefficient against the road surface as parameters and stored as a map 91, as shown in FIG. 8. In FIG. 8, μ max=1 means that the friction coefficient is the lowest while μ max=5 means that the friction coefficient is the greatest. This can be said so in the map 81 of FIG. 7.

It is to be noted that, although the maximum friction coefficient against the road surface may manually be set by the operator, it may be estimated as follows. In other words, the maximum friction coefficient can be estimated in accordance with the magnitude of acceleration obtainable by subtracting the revolution speed of the undriven wheel after a predetermined time period elapsed from the time point t1 of FIG. 3 from the revolution speed of the undriven wheel at the time point t1. Further, it can be estimated on the basis of the maximum acceleration among the magnitudes of acceleration monitored on the basis of a variation in the revolution speed over the entire time period of the latest slip control.

Control of Spark Timing

A control unit UIG is provided for controlling the spark timing of the engine. The control unit UIG is basically constructed so as to determine the spark timing on the basis of the signal of the throttle opening angle from the sensor 61 and he signal of the number of revolutions of the engine from the sensor 72. The spark timing decided is generated to an igniter 51 and the primary current of an ignition coil 52 is blocked at this spark timing. The secondary current of a high voltage generated by blocking the primary current is fed to a spark plug 54 through a distributer 53.

Various signals from the control unit UTR for slip control enters into the control unit UIG, and the signals received may include, for example, signals of the slip flag indicating whether slip control is under way or not, the presence or absence of an out-of-order signal (step P12 of FIG. 4), the position of the motor 106, the accelerator opening angle, the wheel speed of the driven wheel (VK), and the wheel speed of the undriven wheel (VJ). Except for the signals of the out-of-order signal and the slip flag, the other signals may be entered directly into the control unit UIG without passage through the control unit UTR.

The control unit UIG sets four kinds of correction for the spark timing concerning slip control. Firstly, when the control unit UTR for slip control becomes out of order or is brought into trouble, the spark timing is corrected by retarding it for a given time period from the time when the slip control is suspended due to trouble of the control unit UTR. And an amount of retarding the spark timing is represented by a first correction amount $\theta 1$. Secondly, the spark timing is corrected by retarding it in accordance with the magnitude of the slip value S of the driven wheel during control slip, and an amount of retarding the spark timing is represented by a second correction amount $\theta 2$. Thirdly, the spark timing is retarded and corrected when an amount of changing (reducing) the throttle opening angle due to slip control is large. This amount of retarding the spark timing is represented by a third correction amount $\theta 3$. Fourthly, in the control-unreactive region (see FIG. 2(d)) where the throttle opening angle cannot be reduced by the slip control, the spark timing is retarded and corrected in order to compensate for the portion corresponding to the control-unreactive region. The amount of this retarding is represented by a fourth correction amount $\theta 4$.

Figure 10:
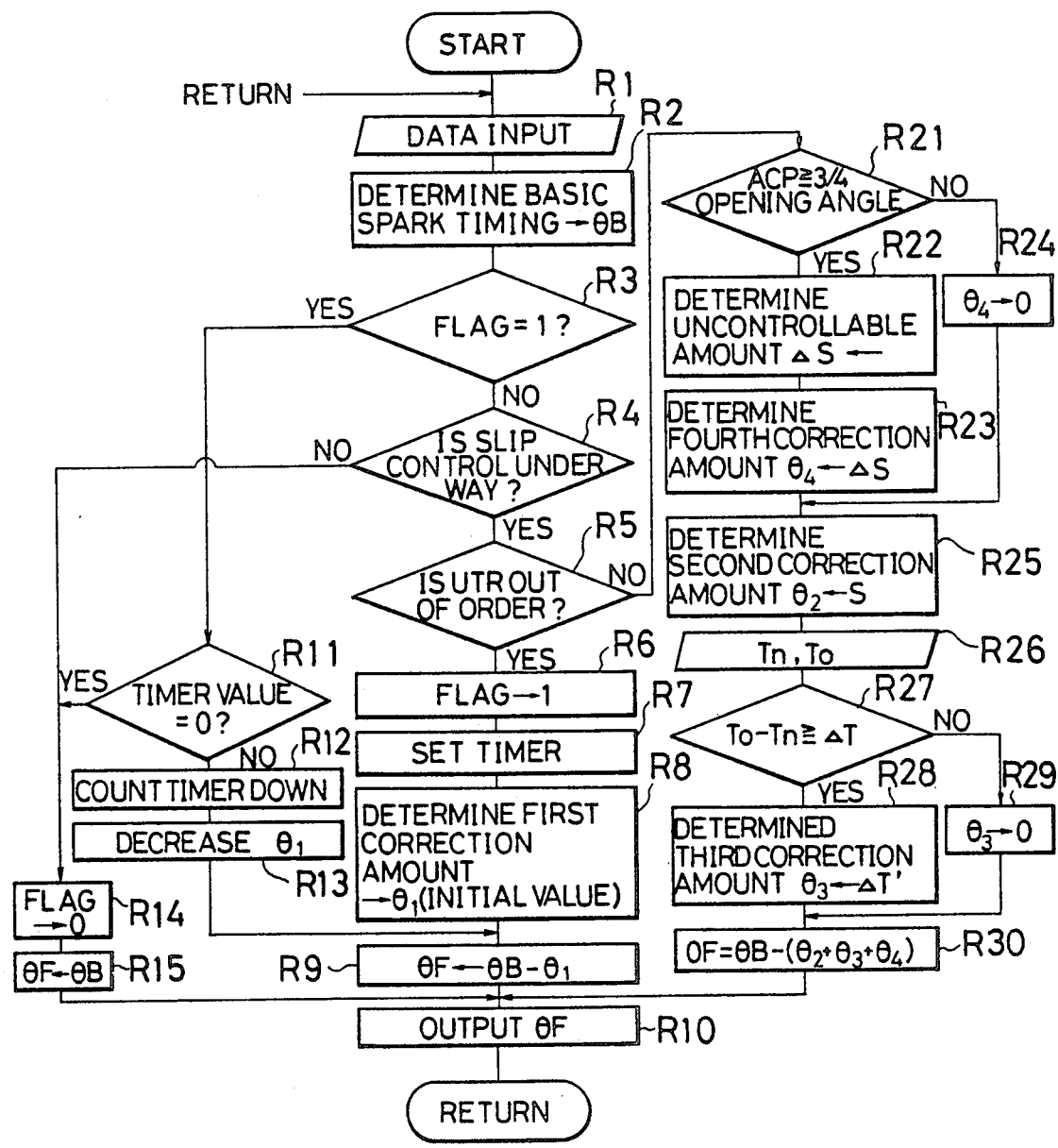

Given the foregoing, the control content by the control unit UIG will be described in conjunction with the flow chart of FIG. 10.

First at step R1, signals are entered from the sensors and switches and the control unit UTR for slip control. Then at step R2, the basic spark timing $\theta B$ is determined on the basis of the throttle opening angle and the revolutions of the engine in the manner known to the art. It is known that the basic spark timing contains a portion of correction, such as correction of the temperature of intake air, correction of the temperature of water, correction of acceleration and so on, so that no description of those correction will be made herein for brevity of explanation. As described hereinabove, at step R2, the spark timing except for the portion of correction concerning the slip control is determined.

At step R3, it is decided whether the flag is 1. This flag is set to 1 when correction by retarding the spark timing is made by the first correction amount $\theta$ 1. If the decision at step R3 is NO, the flow advances to step R4 where it is further decided whether or not the slip control is under way or not (by watching the slip flag). If the decision at step R4 is yES, on the one hand, it is decided at step R5 whether or not the out-of-order signal is generated from the control unit UTR to thereby decide the presence or absence of a trouble of the control unit UTR. If it is decided at step R5 that the control unit UTR is in trouble, retarding the spark timing is corrected for the time of trouble. In other words, at step R6, the flag is set to 1 and a timer is set at step R7 to a given time period when the correction is made on the basis of the first correction amount $\theta$ 1. Thereafter at step R8, an initial value for the first correction amount $\theta$ 1 is set. It is to be noted herein that this initial value may be set, for example, on the basis of the slip value S (the difference of the wheel speeds between the driven and undriven wheels) at the time when a trouble has occurred In this case, the greater the slip value S, the greater the first correction amount $\theta$ 1. After step R8, the final spark timing $\theta$ F is calculated by subtracting the first correction amount $\theta$ 1 from the basic spark timing $\theta$ B at step R9 and the engine is ignited at this final spark timing $\theta$ F at step R10.

After the process at step R6 and when it is decided at step R3 that the flag is set to 1, it is then judged at step R11 whether the timer value set at step R7 is set to zero, namely, whether a given period of time has elapsed after the startup of correction by retarding at the time of trouble. If the decision at step R11 is NO, on the one hand, the flow proceeds to step R12 where the timer is counted down and then at step R13 the first correction amount $\theta$ 1 is reduced by a given decrement followed by transferring the flow to step R9. The first correction amount $\theta$ 1 is gradually decreased from the initial value in this manner.

When it is decided at step R11 that the timer value is zero, on the other hand, the flag is reset to zero at step R14 and the basic spark timing $\theta$ B is set as the final spark timing $\theta$ F. Then the flow proceeds to step R10.

When the decision is NO at step S5, it is then judged at step R21 whether or not the accelerator opening angle accounts for three quarters or over (75% or more). This judgment is to decide whether the control-unreactive region as shown in FIG. 2(d) is provided. If the decision at step R21 is YES, the throttle opening angle required so as to make up for an uncontrollable amount, i.e., the opening angle of the motor 106 (refer to step P34 of FIG. 6), is determined as $\Delta$ S at step R22. Then at step R23, the fourth correction amount $\theta$ 4 is determined in accordance with this throttle opening angle $\Delta$ S. The greater the throttle opening angle $\Delta$ S, the greater the fourth correction amount $\theta$ 4. If the decision at step R21 is NO, the flow proceeds to step R24 and the fourth correction amount $\theta$ 4 is set to zero.

After step R23 or R24, the second correction amount $\theta$ 2 is determined on the basis of the slip value S of the driven wheel at step R25. In this instance, the greater the slip value S, the greater the second correction amount $\theta$ 2.

After step R25, it is judged at step R26 whether or not the difference $\Delta$ T' between the current target opening angle Tn of the motor 106 and the latest target opening angle TO (the target opening angle Tn before one cycle), i.e., an amount $\Delta$ T' of changing the torque generated by the engine in the decreasing direction, is equal to or greater than a given value $\Delta$ T. If the decision is yES at step R27, on the one hand, the third correction amount $\theta$ 3 is determined in accordance with the amount $\Delta$ T' at step R28. It is noted herein that the greater the amount $\Delta$ T', the greater the third correction amount $\theta$ 3. When the decision at step R27 is NO, on the other, the third correction amount $\theta$ 3 is set to zero at step R29.

After step R28 or R29, the final spark timing $\theta$ F is determined at step R30 by subtracting each of the correction amounts $\theta$ 2, $\theta$ 3 and $\theta$ 4 from the basic spark timing $\theta$ B. Then the flow advances to step R10.

Variant 1

Figure 11:
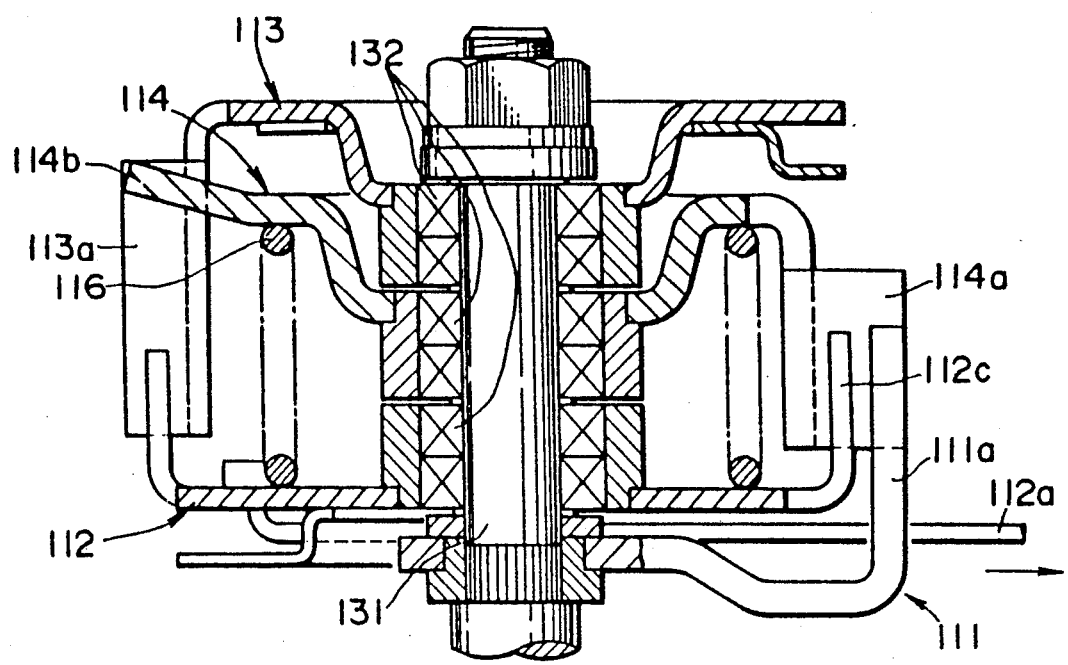
FIGS. 11–14 are diagrammatic representations showing modifications of the throttle opening angle adjusting mechanisms.
Figure 12:
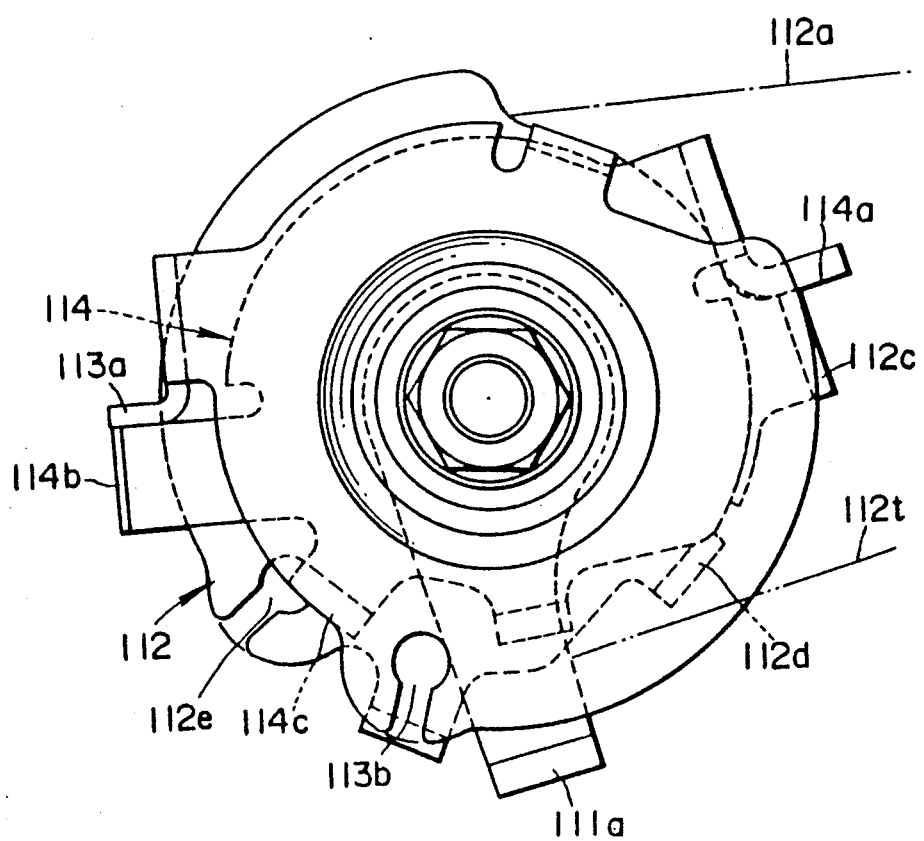
Figure 13:
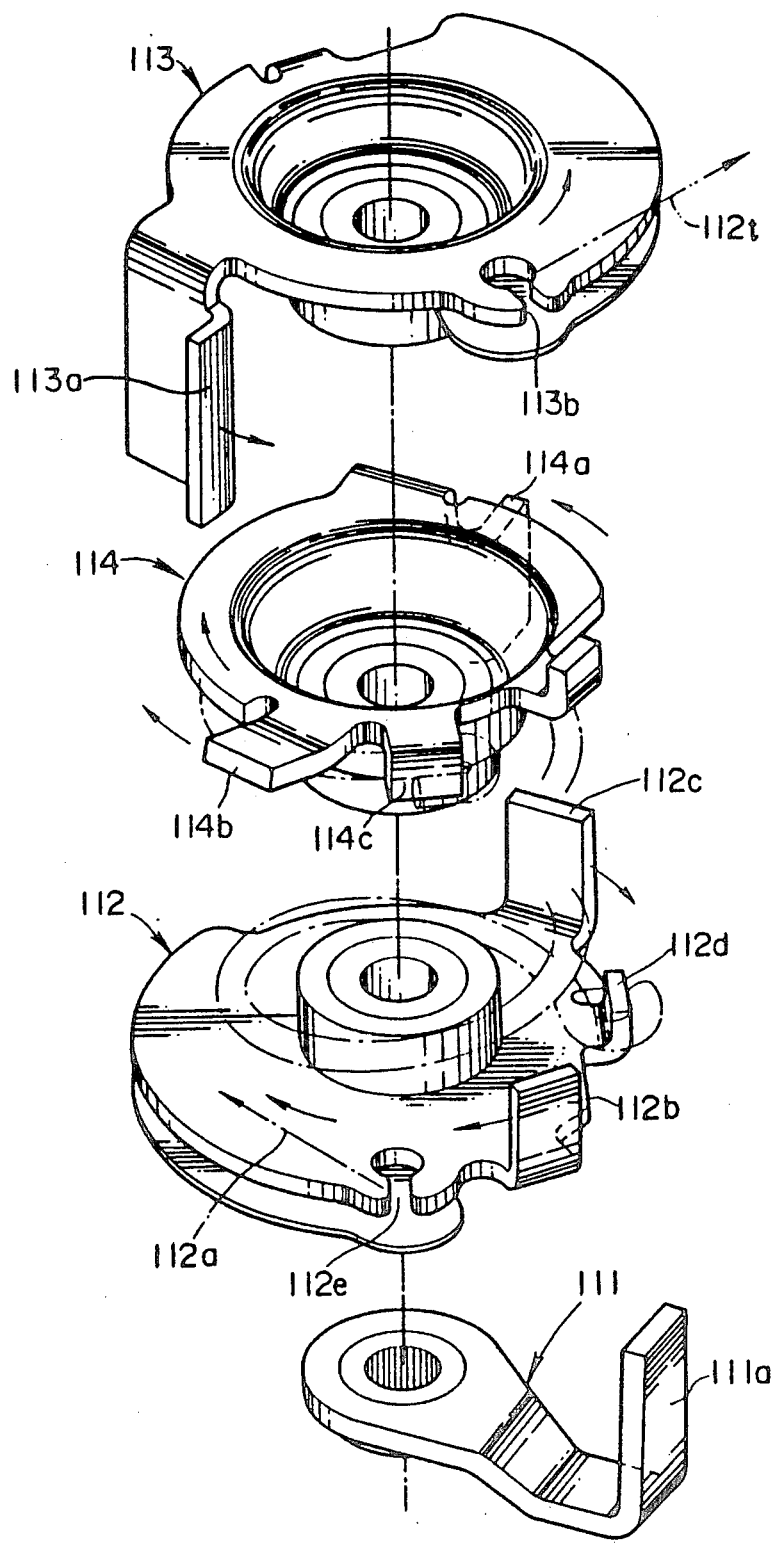
Figures 14A, 14B:
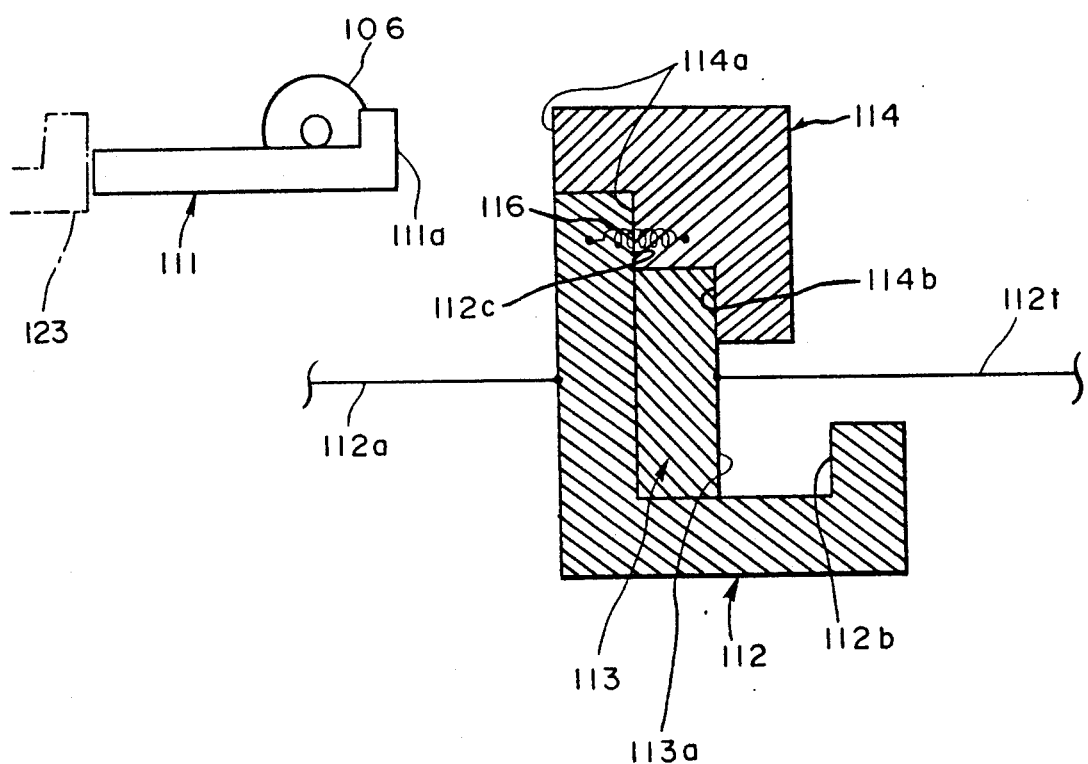

Description will be made of the throttle opening angle adjusting mechanism 44 of a rotary type, in conjunction with FIGS. 11 to 13. FIG. 14 describes the throttle opening angle adjusting mechanism 44 which is modified to a stroke type from that of FIGS. 11 to 13.

In the drawings, reference numeral 131 denotes a shaft to be rotatable by the motor 106, and the shaft 131 may be a rotary shaft itself of the motor 106 or an output shaft of a decelerator, which receives input from the motor 106. Each of levers 111 to 114 is of a ring shape and is engaged with the shaft 131. The lever 111 only is spline-coupled so as to integrally rotate with the shaft 131, while the other three levers 112, 113 and 114 are disposed so as to be rotatable relative to each other through a bearing 132.

Each of the levers 111, 112, 113 and 114 is provided with one or plural claw portions for acting upon the other lever. Description of the claw portion or portions will be omitted because its description will be apparent from reference to FIG. 14. It is to be noted, however, that the claw portions 112d and 114c are provided so as to be engageable with each end of a spring 116 as a coil spring.

The lever 113 is further provided with a stopper portion 113b for suspending one end of a throttle wire 112t, while the lever 112 is further provided with a stopper portion 112e for suspending one end of an accelerator wire 112a. A stopper 123 as shown in FIG. 14 may be comprised of a casing for the motor 106 or the like, although the stopper 123 may be omitted.

Variant 2

Figure 15:
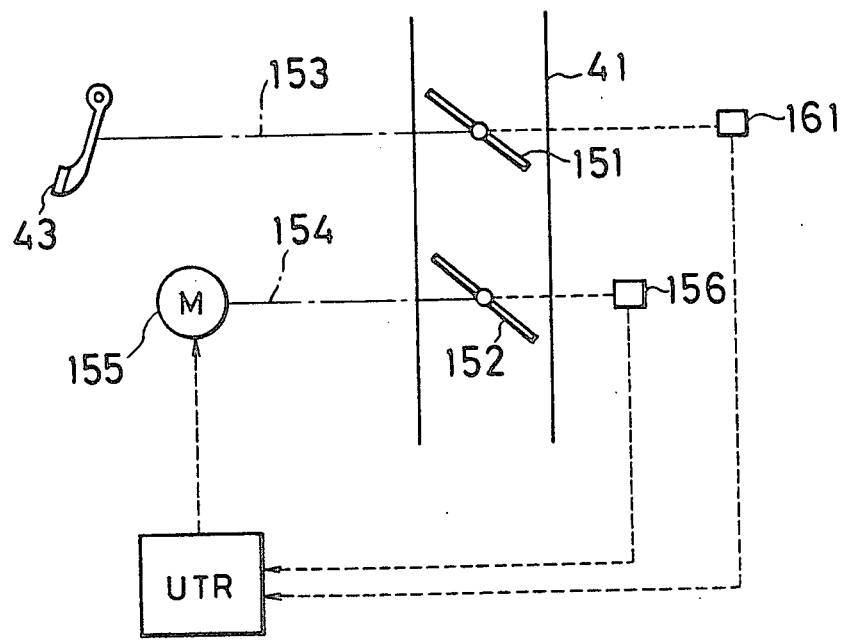
FIGS. 15 and 18 are views showing the construction of the control-unreactive region.

FIG. 15 illustrates another example of the structure of the control-unreactive region. In this example, an air intake passage 41 is provided in series with a main throttle valve 151 and a secondary throttle valve 152. The main throttle valve 151 is connected through a wire 153 or the like to an accelerator pedal 43, thereby allowing the main throttle valve 151 to vary in its opening angle from 0% to 100% in accordance with variations in the accelerator opening angle from 0% to 100%, respectively. The main throttle valve 151 is biased by a spring (not shown) in a direction of closing the valve.

The secondary throttle valve 152 is constructed so as to be driven by a motor 155 through a connection mechanism 154 such as a wire or a link. The motor 155 is controlled by the control unit UTR for slip control. In other words, the substantial opening angle of the air intake passage 41 is decided by the main throttle valve 151 or the secondary throttle valve 152, whichever smaller its opening angle is, so that slip control is performed by making the opening angle of the secondary throttle valve 152 smaller than the opening angle of the main throttle valve 151. As a matter of fact, the slip control using the secondary throttle valve 152 is carried out by the control unit UTR and the secondary throttle valve 152 is retained in its full open position (100% open) when no slip control is required.

In order to provide the control-unreactive region, the secondary throttle valve 152 is constructed such that its opening angle is not caused to become 25% or below when the accelerator opening angle (equivalent of the opening angle of the main throttle valve 151) is nearby its maximum opening angle, i.e., when it is 75% or greater, for example. Hence, a sensor 156 is provided so as to detect an actual opening angle of the secondary throttle valve 152, and the motor 155 is driven so as not to allow the actual opening angle of the secondary throttle valve 152 detected by the sensor 156 to reach 25% or below.

Description will be made of a preferred embodiment in which the secondary throttle valve 152 is provided, in conjunction with the flow sheet of FIG. 16, which corresponds to FIG. 6.

First, if the point of time is decided at step P41 when the slip flag is changed from zero to 1, the final target opening angle Tn of the motor 155 (corresponding to the actual opening angle of the secondary throttle valve 152) is set at step P42 to the lowest control value SM (corresponding to step P32 of FIG. 6). When the decision is NO at step P41, it is judged at step P43 whether or not the slip flag is set to 1. When it is decided at step P43 that the slip flag is not set to 1, the flow advances to step P44 and the final target opening angle Tn of the motor 155 is set to 100% (corresponding to step P35 of FIG. 6).

Figure 17:
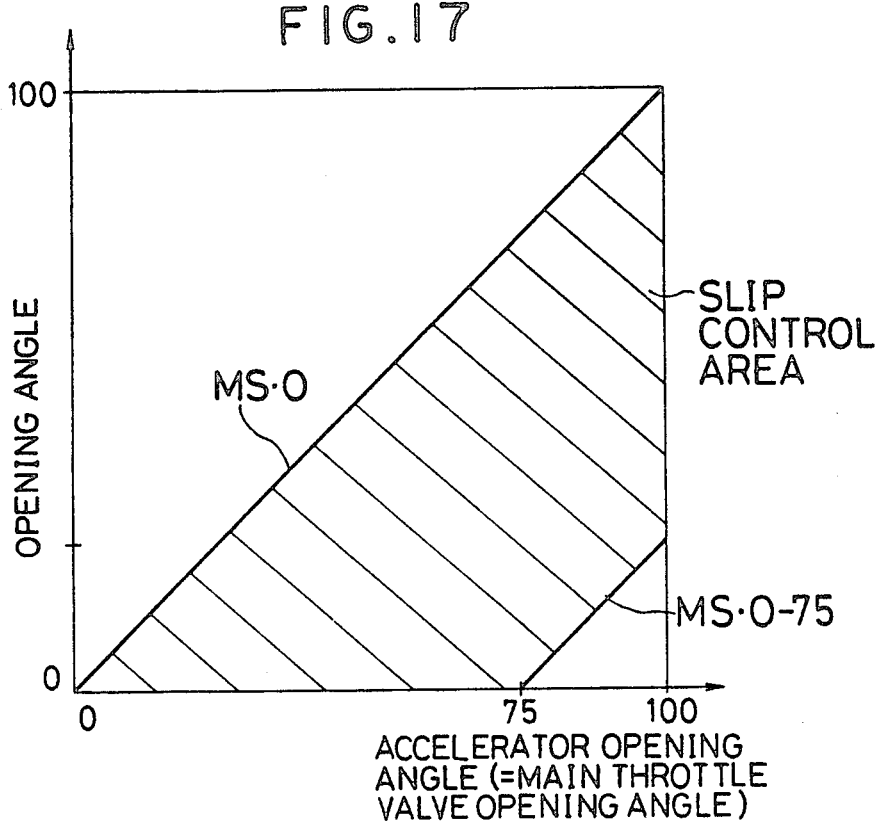
FIG. 17 is a graph showing an opening angle region to be given by a secondary throttle valve in the slip control of the control content as shown in FIG. 16.

When the decision at step P43 is YES, the current opening angle of the main throttle valve 151 (=accelerator opening angle) is set to read as MS·O at step P45 on the basis of output from a sensor 161 of FIG. 15. Then at step P46, it is decided whether the MS·O is 75% or greater. When the decision at step P46 is YES, it is further decided at step P47 whether or not a target opening angle TH·M corresponding to the target slip value SET for engine is 25% or smaller. If the decision is YES at step P47, the flow proceeds to step P48 where the target opening angle TH·M is judged whether to be smaller than MS·O−75. When it is decided at step P48 that the target opening angle TH·M is smaller than MS·O−75, the final target opening angle Tn of the motor 155 is set to MS·O−75 at step P49. This final target opening angle Tn set at step P49 means that the secondary throttle valve 152 is controlled on the basis of the characteristic line corresponding to MS·O−75 as shown in FIG. 17. In other words, the secondary throttle valve 152 varies within the range from 0% to 25% when the accelerator opening angle varies from 75% to 100%.

When the decision is NO at step P46, P47 or P48, the flow proceeds to step P50 in each case, where the final target opening angle Tn is set as a target opening angle TH·M in accordance with the target value SET for engine (corresponding to step P34 of FIG. 6).

After step P42, P44, P49 or P50, the motor 155 is driven so as to reach the final target opening angle Tn at step P51.

A hatched area as shown in FIG. 17 is the area for which the opening angle of the secondary throttle valve 152 can account for during slip control as described hereinabove.

Figure 16:
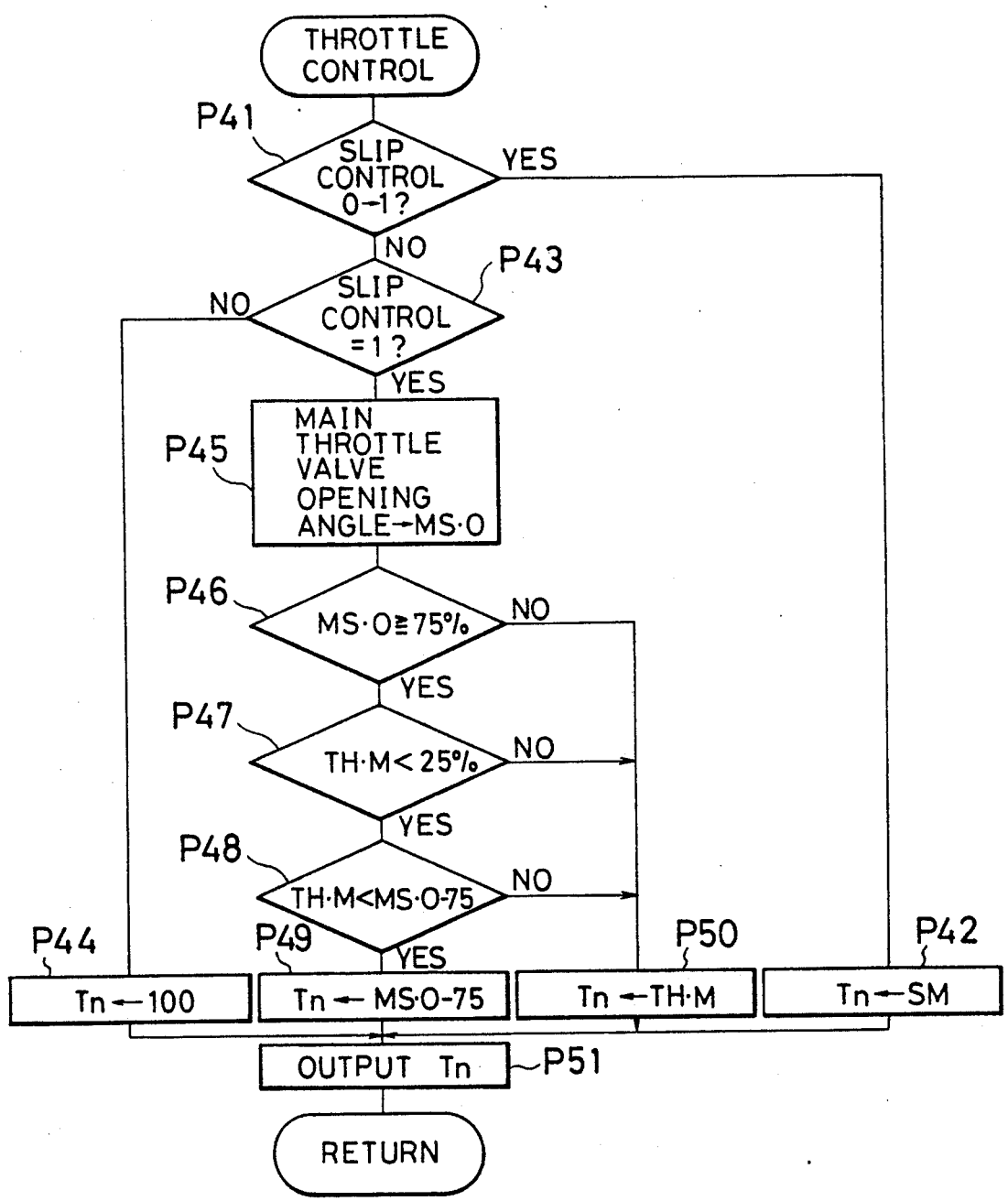
FIG. 16 is a flow chart showing a preferred control example of Example 15 or 18.
Figure 18:
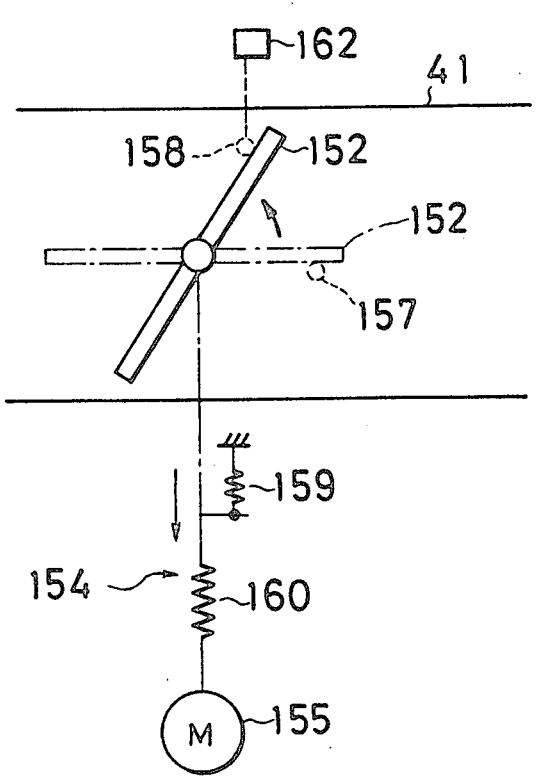

In addition to or in place of the control as shown in FIG. 16, the structure as shown in FIG. 18 may also be adopted. As shown in FIG. 18, the secondary throttle valve 152 is provided with two stoppers 157 and 158. The stopper 157 is of a fixed type and is arranged so as to allow the secondary throttle valve 152 to abut with the stopper 157 for blocking its further rotation when the secondary throttle valve 152 is rotated in its opening direction and opened to its full extent (its opening angle accounting for 100%). The stopper 158 is of a variable type drivable by an electromagnetic actuator 162 such as a motor and is designed so as to take two positions, i.e., an operating position in which it can act upon the secondary throttle valve 152 and a rest position in which it cannot act upon it. If the stopper 158 of the variable type is located in the operating position as shown in FIG. 8, it is designed so as to abut with the secondary throttle valve 152 and block it rotation, for example, when the secondary throttle valve 152 is pivoted in its closing direction to a given opening angle, for example, 25%. Both of the stoppers 157 and 158 are disposed outside the air intake passage 41 and are constructed such that they abut with respective levers (not shown) projected from a rotary shaft of the secondary throttle valve 152. An actuator 162 for driving the stopper 158 of the variable type is controlled by the control unit UTR, and it takes its operating position when the accelerator operating angle accounts for 75% or more and it takes its rest position when the accelerator operating angle accounts for less than 75%. It is also possible to allow the stopper 158 to take a position in which the opening angle is set at step P49 of FIG. 16 or to be fixed in a position corresponding to a given opening angle accounting for 25%, for example.

The secondary throttle valve 152 is biased by a first biasing means 159 so as to take its full open position, i.e., so as to abut with the stopper 157, thereby securing the retaining of the secondary throttle valve 152 in its full open position. The first biasing means 159 may specifically be composed of a coil spring disposed around the rotary shaft of the secondary throttle valve 152.

A second biasing means 160 is disposed on a connection mechanism 154, such as a wire, for connecting the secondary throttle valve 152 to the motor 155. This second biasing means 160 has a biasing force greater than the first biasing means 159 and acts upon the secondary throttle valve 152 so as to pivot in its closing direction when a stretching force is provided by the motor 155 in the direction extending the second biasing means 160.

When a force is given by the motor 155 for pivoting the secondary throttle valve 152 in its closing direction from the position wherein the secondary throttle valve 152 is full open, the second biasing means 160 does not undergo elastic transformation and makes the opening angle of the secondary throttle valve 152 smaller by the opening angle corresponding to a control signal to the motor 155 unless the pivotal movement of the secondary throttle valve 152 in its closing direction is blocked by the stopper 158.

When the motor 155 further drives the secondary throttle valve 152 in its closing direction from the position in which the secondary throttle valve 152 is brought into abutment with the stopper 158, the second biasing means 160 is stretched so as to absorb a surplus of the driving force of the motor 155, thereby preventing an undesirably large exterior force from acting upon the secondary throttle valve 152 and an overload from imposing upon the motor 155.

In the above embodiment, the slip value of the driven wheel is indicated as a difference between the speeds of the driven and undriven wheels, but it can be indicated as its ratio. Further, slip control may be performed by means of engine control alone. An engine control means for supplementing slip control in the control-unreactive region may be of a type stopping a supply of fuel.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A slip control system of a vehicle having a load adjusting means for adjusting a load of an engine and a slip control means for reducing torque to be generated by the engine by controlling the load adjusting means prior to operation of an accelerator when a driven wheel slips to a large extent, wherein:
    a control-unreactive region setting means for setting a control-unreactive region is provided so as to allow the load adjusting means to ensure a given amount of operation of the accelerator nearby a maximum opening angle of the accelerator prior to slip control by the slip control means;
    an engine control means is provided for controlling the engine on the basis of a predetermined condition so as to change the torque to be generated by the engine without control of the load adjusting means; and
    a correction means for correcting a control value of the engine control means in a direction of reducing the torque to be generated by the engine in the control-unreactive region.

2. A slip control system as claimed in claim 1, wherein:
    the engine control means is a means for controlling a spark timing; and
    the correction means corrects so as to retard the spark timing.

3. A slip control system as claimed in claim 1, wherein:
    the slip control is suspended if a trouble occurs to such an extent that the slip control fails to be performed by the slip control means in a normal way during the slip control by the slip control means; and
    wherein another correction means is further provided for correcting a control value by the engine control means in a direction of reducing the torque to be generated by the engine, whether or not in the control-unreactive region, for a given time period from the point of time at which the slip control is suspended due to the trouble.

4. A slip control system as claimed in claim 3, wherein:
    an amount of correction by the another correction means, or an amount of reducing the torque to be generated by the engine, is gradually reduced.

5. A slip control system as claimed in claim 4, wherein an initial value of the amount of correction by the another correction means is set to increase as a slip value of the driven wheel increases at the point of time when the slip control is suspended.

6. A slip control system as claimed in claim 1, further comprising:
    a slip detecting means for detecting a slip value of the driven wheel against a road surface; and
    another correction means for correcting a control value by the engine control means in accordance with the slip value to be detected by the slip detecting means, whether or not in the control-unreactive region.

7. A slip control system as claimed in claim 6, wherein an amount of correction by the another correction means, or an amount of reducing the torque to be generated by the engine, is set to increase as a slip value to be detected by the slip detecting means increases.

8. A slip control system as claimed in claim 1, further comprising another correction means for correcting a control value of the engine control means in a direction of reducing the torque to be generated by the engine, whether or not in the control-unreactive region, when an amount of increase of the control value by the slip control means, or an amount of change of the torque to be generated by the engine in its decreasing direction, is equal to or higher than a given value.

9. A slip control system as claimed in claim 8, wherein the amount of correction by the another correction means, or the amount of reduction of torque to be generated by the engine, is set to increase as the amount of increase of the control value by the slip control means increases.

10. A slip control system as claimed in any one of claims 3 to 9, wherein:
    the engine control means is a means for controlling a spark timing; and
    the amount of correction by the correction means and by the another correction means is set as a value of retarding the spark timing.

11. A slip control system as claimed in claim 1, wherein:
    the amount of correction by the correction means increase as an amount controllable by the slip control means increases.

12. A slip control system as claimed in claim 1, wherein the load adjusting means is subjected to feed-forward control so as to allow a control value for the load adjusting means to reach a given control value at the time of starting slip control by the slip control means.

13. A slip control system as claimed in claim 12, wherein the given control value is set in accordance with a friction coefficient on a road surface.

14. A slip control system as claimed in claim 13, wherein the given control value is set so as to allow an amount of reducing the torque to be generated by the engine to increase as the friction coefficient on the road surface decrease.

15. A slip control system as claimed in claim 1, further comprising:
    a slip detecting means for detecting a slip value of a driven wheel against a road surface;
    wherein slip control by the slip control means is performed so as to subject the load adjusting means to feedback control for the slip value to be detected by the slip detecting means to reach a given target value.

16. A slip control system as claimed in claim 15, wherein slip control by the slip control means is started when the slip value to be detected by the slip detecting means reaches a value equal to or greater than the given target value.

17. A slip control system as claimed in claim 1, further comprising:
- a brake adjusting means for adjusting a braking force of the brake disposed at the driven wheel; and
- a second slip control means for applying the braking force to the driven wheel by controlling the brake adjusting means when the slip value of the driven wheel gets larger.

18. A slip control system as claimed in claim 17, further comprising a slip detecting means for detecting a slip value of the driven wheel against a road surface;
wherein slip control by the second slip control means is performed to subject the brake adjusting means to feedback control so as to allow the slip value to be detected by the slip detecting means to reach a given target value.

19. A slip control system as claimed in claim 1, further comprising:
- a slip detecting means for detecting a slip value of the driven wheel against a road surface;
- a brake adjusting means for adjusting a braking force of the brake disposed at the driven wheel; and
- a second slip control means for subjecting the brake adjusting means to feedback control for the slip value to be detected by the slip detecting means to reach a given target value; and
wherein the slip control means for controlling the load adjusting means is subjected to feedback control so as to allow the slip value to be detected by the slip detecting means to reach a given target value.

20. A slip control system as claimed in claim 19, wherein the target value by the slip control means is set as a value different from the target value by the second slip control means.

21. A slip control system as claimed in claim 20, wherein the target value by the slip control means is set as a value which is smaller than the target value by the second slip control means.

22. A slip control system as claimed in claim 21, wherein:
- the control value for the load adjusting means is subjected to feed-forward control so as to reach a given control value when slip control by the slip control means is started; and
- the load adjusting means is subjected to feedback control after the feed-forward control.

23. A slip control system as claimed in claim 1, wherein:
- the load adjusting means is mechanically connected to the accelerator; and
- a control-unreactive region setting means for setting the control-unreactive region is provided in a mechanism for mechanically connecting the load adjusting means to the accelerator.

24. A slip control system as claimed in claim 23, wherein the control-unreactive region setting means comprises:
- a first lever connected to the accelerator so as to be displaceable in a given one direction in accordance with operation of the accelerator in its opening direction;
- a second lever connected to the load adjusting means;
- a first biasing means for biasing the second lever and eventually the load adjusting means in a direction of reduction of the torque to be generated by the engine;
- a third lever disposed so as to be abuttable with the first lever and the second lever from the given one direction;
- a second biasing means having a biasing force greater than the first biasing means, which is disposed so as to bias the third lever in a direction of abutting with the first lever from the given one direction and to displace the second lever so as to follow the first lever through the third lever;
- an electromagnetic actuator disposed to be controllable by the slip control means for driving the third lever in a direction opposite to the given one direction in resistance to the biasing force of the second biasing means; and
- a pressing section formed on the first lever and disposed so as to be abuttable with the second lever from the given one direction so as to provide a given clearance relative to the second lever in a state in which the third lever is in abutment with the first lever from the given one direction.

25. A slip control system as claimed in claim 24, wherein the first lever, the second lever and the third lever are disposed so as to be linearly movable in parallel to their respective axes.

26. A slip control system as claimed in claim 24, wherein the first lever, the second lever and the third lever are disposed so as to be pivotable around their respective axes.

27. A slip control system as claimed in claim 26, wherein:
- the electromagnetic actuator is a motor of rotary type;
- the given axes are each an axis of a rotary shaft to be rotated in accordance with rotation of the motor; and
- the third lever is disposed so as to be integrally rotatable with the rotary shaft.

28. A slip control system as claimed in claim 27, wherein:
- the first lever and the second lever are disposed so as to be pivotable about the rotary shaft; and
- the second biasing means is disposed so as to surround an outer periphery of the rotary shaft, one end of the second biasing means being engaged with the first lever and the other end thereof being engaged with the third lever.

29. A slip control system as claimed in claim 28, wherein:
- the first lever is connected to the accelerator through a wire; and
- the second lever is connected to the load adjusting means through the wire.

30. A slip control system as claimed in claim 1, wherein:
- the engine is of an Otto type in which a load is adjusted by adjusting an amount of intake air; and
- the load adjusting means is a throttle valve for adjusting the amount of intake air.

31. A slip control system as claimed in claim 1, wherein the control-unreactive region is disposed so as to account for approximately 25% of a maximum operation amount as an amount of operation of the load adjusting means when the accelerator is full open.

32. A slip control system as claimed in claim 30, wherein the control-unreactive region is disposed so as to open the throttle valve by approximately 25% when the accelerator is full open.

33. A slip control system as claimed in claim 1, wherein:

the engine is of an Otto type in which a load is adjusted by adjusting an amount of intake air;

a main throttle valve is disposed on an air intake passage of the engine so as to be always associated with the accelerator in such a manner that its opening angle varies from 0% to 100% in association with a variation of an opening angle of the accelerator from 0% to 100%;

a secondary throttle valve is disposed on the air intake passage thereof so as to be controllable by the slip control means; and the control-unreactive region is constructed to control the secondary throttle valve so as not to reach a given opening angle or below.

34. A slip control system as claimed in claim 33, wherein a stopper is disposed so as to be abuttable with the secondary throttle valve and to prevent the secondary throttle valve from providing a given opening angle or below.

35. A slip control system as claimed in claim 34, further comprising an electromagnetic actuator drivable and controllable by the slip control means; and the secondary throttle valve is drivable by the electromagnetic actuator.

36. A slip control sytem as claimed in claim 33, wherein the given opening angle is set so as to increase as an opening angle of the accelerator, an opening angle of the main throttle valve increases.

37. A slip control system as claimed in any one of claims 6, 7, 15, 16, 18, 19, 20, 21 and 22, wherein either front or rear wheels are driven wheels and the others are undriven wheels; and the slip detecting means calculates a slip value of the driven wheels on the basis of a revolution speed of the driven wheels and a revolution speed of the undriven wheels.

* * * * *